Feb. 20, 1940.                G. D. WEBBER                2,190,961
                            MEASURING INSTRUMENT
                          Filed April 16, 1938         2 Sheets-Sheet 1
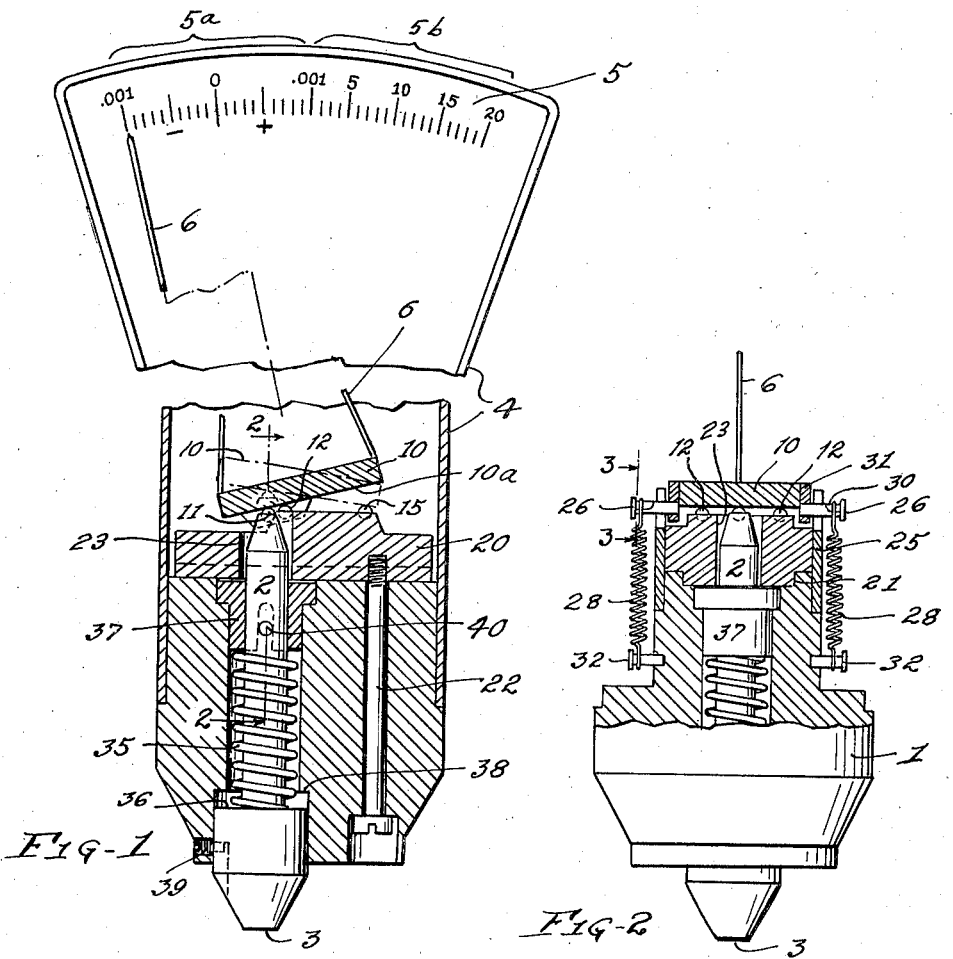
INVENTOR.
George D Webber
BY Bates Goldrick & Neave
ATTORNEYS Feb. 20, 1940.   G. D. WEBBER   2,190,961
MEASURING INSTRUMENT
Filed April 16, 1938   2 Sheets-Sheet 2
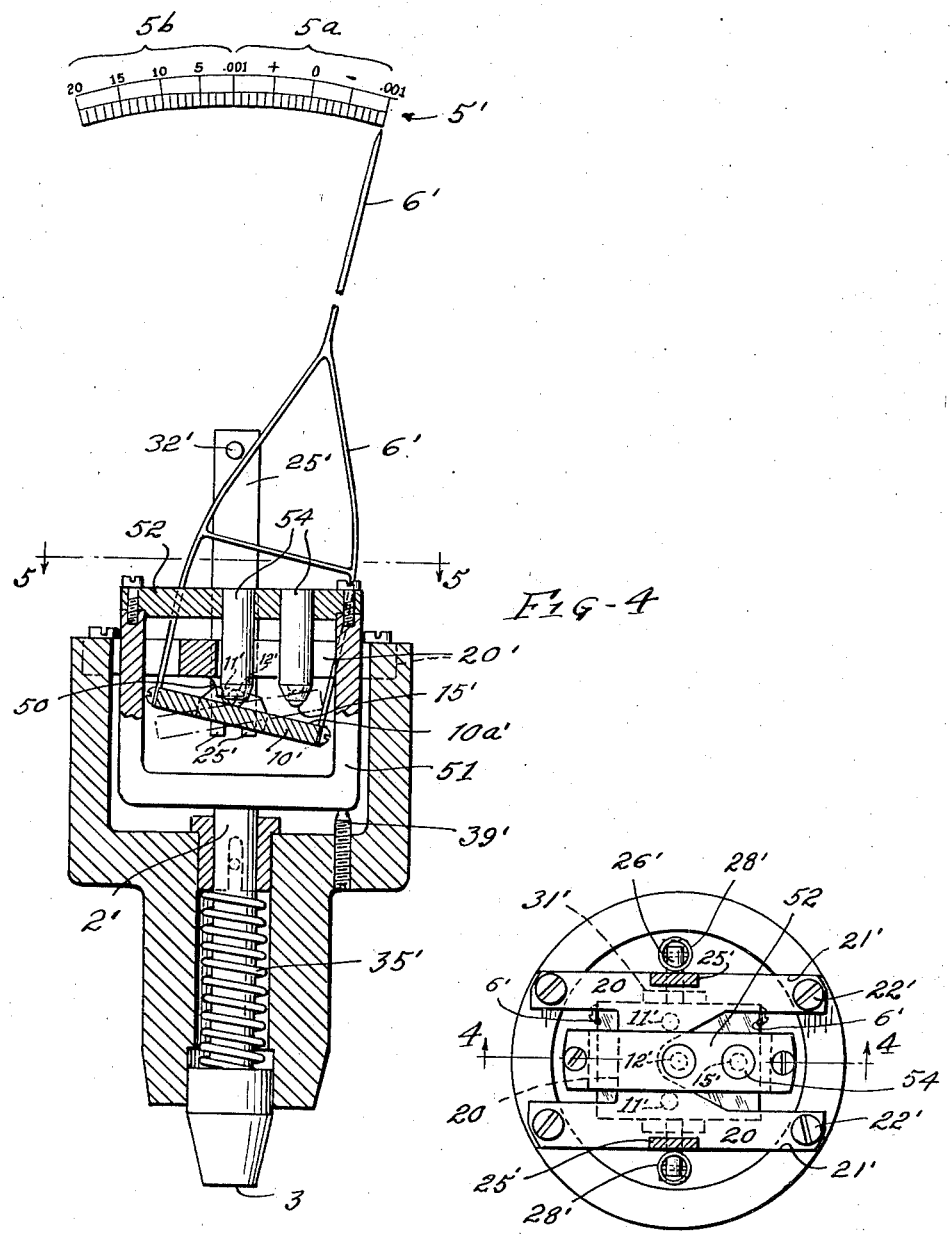

Patented Feb. 20, 1940

2,190,961

UNITED STATES PATENT OFFICE 2,190,961

MEASURING INSTRUMENT

George D. Webber, Cleveland, Ohio, assignor to Webber Metric Gage Company, Cleveland, Ohio, a corporation of Ohio Application April 16, 1938, Serial No. 202,510

11 Claims. (Cl. 33—172)

This invention relates to an improvement in precision measuring instruments, for instance, instruments adapted to ascertain dimensions of articles of manufacture required to be made within close tolerances. The embodiments shown are adapted for use as indicators in connection with machining operations, such as grinding, or as comparators for checking sizes of machined parts. The principles of operation are applicable to measuring instruments generally.

An object is to provide a measuring instrument, which, by the use of a single indicating means, such as a pointer or light beam, can amplify the movement of a measuring member (such as the feeler of an indicator) in at least two ratios and indicate each equally clearly as against graduations that are spaced about the same, on a dial, for both ratios.

By way of indicating a more specific object: one practical problem solved by the invention in the forms shown, is in connection with finishing operations on machining work within extremely close limits. Used, for instance, as a dial gage on a spindle to be ground from a known oversize to a desired diameter, the instrument can be set with the work in position relative thereto so that the amount the work is oversize is indicated by a pointer in thousandths of an inch on the dial of the instrument. As the grinding progresses the instrument can be used to indicate the decreasing amount of oversize in thousandths until the limits within which the work is to be held are approached. Thereupon, the measurement of the work is indicated by the pointer say in ten-thousandths of an inch, but without necessitating reduction in spacing between adjacent graduations on the dial; in other words, just as clearly as were the dimensions in thousandths. The same advantages can be had in an instrument using the principles hereof, but adapted for measuring holes, which, of course, are definitely undersize to start with.

Other objects and features of the invention will become apparent from the following description relating to the accompanying drawings, showing suitable forms. The essential characteristics are summarized in the claims.

Referring briefly to the drawings, Fig. 1 is a central sectional view through the working parts of an instrument arranged to measure distance,— specifically outside dimensions of objects; Fig. 2 is a sectional view thereof, taken substantially along the line 2—2 on Fig. 1; Fig. 3 is a detail view, as indicated by the line 3—3 on Fig. 2; Fig. 4 is a view similar to Fig. 1, showing a modified form of the invention; and Fig. 5 is a top view of the instrument according to Fig. 4; the planes of Figs. 4 and 5 being indicated at 4—4 and 5—5 on respective views.

Referring in detail to the drawings, and first to Figs. 1 to 3; a suitable generally cylindrical body is shown at 1, adapted to be supported on an indicator or comparator frame having a work support, not shown, and having an axially movable feeler pin 2, provided with a head 3, the lower end of which may be suitably shaped (as flat) for contact with the work, or with gage blocks for use in setting the indicating means of the instrument, as is well understood by users of such instruments. Carried on the body 1 is a housing 4, a fan-shaped extension of which has the dial 5. A pointer 6 is mounted on a tiltable beam or table 10; angular movement of which is in accordance with the movement of the feeler pin.

In the specific arrangement shown, the upper end of the feeler pin makes contact with a carefully finished underside surface 10a of the beam 10 through a spherical surface, as of a ball 11 set into a socket at the top of the feeler pin on approximately the longitudinal axis of the beam and concentric with the pin. Through a portion of the tilting movement of the beam, the tilting is about a fulcrum shown as two fixed balls 12, supported on the body as will hereinafter be shown. The dial is divided into two portions 5a and 5b which are preferably contrastively colored.

When the beam or table is being tilted by contact with the balls 11 and 12, the pointer 6 moves across the dial portion 5a. The effective short arm of the lever provided by such fixed and movable spherical supports may, for instance, measure .010″. In such case, assuming a pointer of appropriate length, movement of the feeler one ten-thousandths of an inch can move the pointer from one line on the dial to the next if the dial is graduated in ten-thousandths. The entire portion 5a of the dial is so graduated, the range shown being .001″ on each side of zero position as marked.

In spaced relationship to the set of balls 12, longitudinally of the beam, are balls 16, in a transverse plane parallel to that of the balls 12. All the bals 12 and 15 can be maintained in the same plane, by pressing the balls, as with an arbor and carefully finish pressing block, into slightly undersized holes adapted to receive the balls; pressure being continued until the centers of the balls are slightly below the top plane of the support such as the block 20, Figs. 1 and 2 to be later described more in detail.

The balls 15 can be spaced from the transverse plane of the ball 11, one-tenth of an inch; in other words, effectively ten times as far away from it as are the balls 12. With such spacing, the divisions of the dial at both portions 5a for ten-thousandths and 5b for thousandths can be approximately the same. The slight variations between divisions toward the end portions of the dial necessitated by tilting of the beam from horizontal position are not illustrated. The dial portion 5b, as shown, can indicate a total of nineteen thousandths of an inch movement of the feeler past the .001 mark, or, in other words, the total reading of the dial, in ten-thousandths and thousandths, to the right of the zero mark (plus side) is .020". Greater range could, of course, be had if desired. When the beam 10 shifts from one fulcrum to another, the pointer is between the two sets of graduations 5a and 5b or on the .001 mark to the right of zero. Further raising of the feeler pin causes the beam to tilt about the balls 15 as a fulcrum (note position of beam and ball 11 shown in broken lines) for indicating the measurement in thousandths, as explained above.

The tilting supports 11, 12 and 15, for the table 16, which contact with co-planar surface portions of the beam can be balls, as shown, or knife edges, or any other suitable contact surfaces found effective for tilting such beam. The balls engaging flat surfaces are less expensive and wear longer than knife edges and obviate the necessity for V-notches which are expensive to construct accurately. The pivot supports may or may not contact with the same general surface of the beam, although the instrument is much more economical to construct if only a single side of the beam has to be accurately finished for contact with the pivotal supports. The fixed and movable supports shown may contact with the beam on opposite sides of it, as on coplanar surfaces which face respectively in opposite directions, but this requires more parts than necessitated by the arrangement shown.

The block 20, mentioned above, which carries the balls 12 and 15, is adjustable horizontally in a direction perpendicular to the paper as shown in Fig. 2, as in a channel 21 cut across the top of the body 1. This allows adjustment of the distance between the center of the ball 11 and those of 12 and 15 by movement of the block in the guide for initial calibration. After adjustment, the block 20 can be firmly locked, as by a screw 22 which extends upwardly through a slightly oversized hole in the body 1. The feeler pin 2 extends through an oversize hole 23 in the block 20 to allow the adjustment of the block relative to the ball 11.

The use of ball supports or contact members, such as 11, 12 and 15 on a single flat side of the beam, requires stabilizing means for the beam to prevent accidental rotational movement of the beam in a plane parallel with the surface 10a in all positions of the beam. The detailed construction of one form of stabilizing means is as follows:

The stabilizing arrangement (Figs. 2 and 3) may comprise a pair of posts 25, secured as to the block 1 on opposite sides of the beam 10 and extending upwardly past it, as shown in Fig. 2. Pins 26 extend laterally from the beam 10 into parallel vertical slots 27 in the upper ends of the posts 25. The pins 26 are cylindrical, and have very slight clearance in the slots. Such pins can be located about half-way between the transverse planes of the balls 11 and 12 so that springs, such as 28, can be attached to the pins and pull them downwardly, maintaining the beam 10 in contact with the ball 11 and either the balls 12 or 15 in all tilted positions of the beam. The springs will continue to act in a vertical plane (transversely of the beam) which is nearly half way between the transverse planes of the balls 11 and 12, notwithstanding shifting of the beam longitudinally with reference to the ball centers in tilting, if the diameters of the pins 26 are the same as the balls 11 and 12, and the upper loops of the springs bear on knife edge formations 30 on the pins, which knife edges are directed vertically in the horizontal position of the beam as shown in Fig. 3. The pins 26 may be carried on side plates 31 depending from the beam to facilitate placing of the pins with their centers a few thousandths off the beam surface 10a, this being found to minimize sliding movement of the pins in the slots during tilting of the beam about the closer centers,—as 11 and 12—, the coaction of which effects the more delicate operation with reference to the beam. The lower ends of the springs can be anchored on pins 32 in the sides of the body 1, so disposed that the springs extend parallel to the feeler pin.

In one practical arrangement the supports 11, 12 and 15 are $\tfrac{1}{16}$" calibrated steel balls and the pins 26, in keeping with the above, are $\tfrac{1}{16}$" in diameter at the slots 27 and the axes of the pins are disposed .003" below the beam surface 10a in the horizontal position of the beam.

The feeler pin 2 has a spring 35 bearing downwardly against a shoulder 36 thereon, and upwardly against a bushing 37 which forms an upper guide for the pin. If desired, the force of the spring may be controlled by suitable adjustment, not shown, in order to change the pressure of the feeler on the work. A shoulder 38 can be formed inside the body for limiting upward movement of the feeler pin, to a range such that lifting of the pin cannot derange the working parts operated by the pin. A lateral pin 39 retains the feeler pin in the body against being pushed out by the spring 35. The pin and slot connection at 40, between the feeler pin and its upper guide, prevents displacement of the pivot afforded by the ball 11 in the event said ball is not accurately centered on the axis of the feeler pin.

In the modified construction, according to Figs. 4 and 5, there is a single fulcrum or fixed pivotal support for the beam 10', e. g. two balls 11' engaging the beam surface 10a' and the feeler pin 2' carries two movable pivotal supports 12' and 15', in spaced relation to each other longitudinally of the beam and spaced different distances from the support 11'. The surface of the beam which makes contact with the pivotal supports is opposite the feeler, so that the feeler can move a considerable distance beyond that which causes (permits) the beam to swing in one direction to the limit of its throw. This is desirable in that it permits considerable movement of the feeler without restriction, other than that afforded by the feeler-pressure spring e. g. 35', in being applied to work which is considerably oversize, without danger of damage to the instrument or such work. This is known as an "overrunning" movement of such feeler pin.

Overrunning can be had without so arranging the parts that the feeler pin makes effective contact with the beam on the side of it beyond the feeler. For instance, the instrument, according to Fig. 1 hereof, can have an overrunning arrangement such as shown in Fig. 2 in my copending application, Serial No. 198,414 filed March 28, 1938, or any equivalent arrangement. Said application shows a lost motion connection between feeler pin sections mounted side-by-side.

In an instrument designed with the view to indicating measurements, for instance, in thousandths on part of a dial, and e. g. equally clearly in ten-thousandths on another part (as in both forms shown herein), the effective contact of the feeler pin with the beam on the side of the latter opposite the pin, is of specific advantage where the unitary or alternately active pivotal supports for the beam (corresponding in effect to the fulcrums 12 and 15 of Fig. 1) are on or connected with the feeler. In such case, were contact made below the plate, the movement of the feeler away from the instrument (as would ordinarily be convenient in indicating decreasing size of work) cannot depend practically be translated to a dial through a simple pointer on the beam, either with a dial arranged in the manner shown on Fig. 1, or the reverse thereof, as on Fig. 4. This,—assuming two pivotal supports, spaced longitudinally of the beam and carried on the feeler pin—, is because the swinging of the beam on the intermediate pivot and one extreme pivot (for indicating say in ten-thousandths of an inch) must take place upon movement of the feeler toward the work; but initial reading on the ten-thousandths portion of the dial is not the desired arrangement. If the dial were reversed, then the reading would not correspond to the lever ratios afforded by the two pivots which cooperate alternately with the remaining pivot.

However, in measuring holes with an instrument the feeler of which approaches the tilting beam as the hole being measured is enlarged, the arrangement of pivots according to Fig. 4 (two on the feeler) could then be used on the side of the beam adjacent the feeler, as in Fig. 1.

Referring further to Figs. 4 and 5 the fixed pivotal support for the beam, balls 11, are carried on an H-shaped block 20' which can be adjusted longitudinally of the beam 18', and locked in place in a guideway 21' after the proper distance is obtained between the fixed and movable supports, as by cap screws 22'. The balls 11' are supported in sockets on the underside of the block 20' in depending plateau effects 50 of the block. The upper end of the feeler pin 2' has a yoke effect 51 and bridge piece 52, which overhangs the cross portion of the block 20' and supports depending studs 54 which carry the balls 12' and 15' in sockets at their lower ends.

The stabilizing arrangement for the construction, according to Figs. 4 and 5, is not illustrated in detail, but slotted posts 25' can depend from the block 20' on each side of the beam 18' for guiding the stabilizing pins 26' to which springs 28' (reaching upwardly to anchors positioned as at 32', (Fig. 4) are secured in the same manner as illustrated in Fig. 3. In this case, the pins 26' would have their centers located a few thousandths above the top surface of the beam 18', which makes contact with the spherical supports. An adjustable down stop for the feeler pin is shown at 39'. The operation of the Fig. 4 and 5 modification is essentially the same as that of the first described form.

I claim:
1. A stabilizer for a measuring beam, having coplanar surfaces bearing on spaced relatively movable pivot members, comprising guides at opposite sides of the beam extending normal to the beam in a position thereof intermediate the limits of its swing, and pins extending laterally from the beam into contact with the guides.

2. The construction, according to claim 1, wherein the guides have slots with parallel surfaces which are substantially in contact with opposite sides of the respective pins.

3. The construction, according to claim 1, wherein springs engage the pins and extend parallel to the guides, to hold the beam in contact with the pivot members.

4. The construction, according to claim 1, wherein the pivot members are spherical at the regions which contact with said surfaces, the pins are circular where they engage the guides and of the same diameter as the effective spheres.

5. A distance-measuring instrument, comprising a beam, three pivot members for the beam spaced longitudinally of it at three locations, a common supporting means for two of the members and an independent supporting means for the other, said two means being relatively movable parallel to the plane of movement of the beam in order to tilt the beam, a work-contacting member operatively connected to one of said means for effecting said relative movement, two of the pivot members contacting detachably with the beam on one side only thereof so that they can be automatically rendered inactive as pivots during predetermined portions of the entire tilting movement of the beam in one direction, so that the motion of the work-contacting member can be amplified in two ratios, and means controlled by such movement of the beam to indicate with reference to a scale the motion of the beam.

6. A distance measuring instrument, comprising a beam, two fulcrums for the beam which are alternately rendered active as such on coplanar surfaces of the beam by tilting of the beam from one position to the other about a fixed support, a work-contacting member connected with the fulcrums in a manner to effect tilting movement of the beam on such support, and a single indicating means controlled by such tilting movement of the beam to enable a measurement to be read at a region remote from the beam.

7. A stabilizer for a measuring beam having coplanar surfaces bearing on spaced relatively movable pivot members, two of which become alternately active as pivots during an entire tilting movement of the beam in one direction for enabling motion indications at different ratios of imparted to transmitted movements, said stabilizer comprising guides at opposite sides of the beam extending normal to the beam in a position thereof intermediate of the extreme limits of its throw, and pins extending laterally from the beam into contact with the guides.

8. An indicator gage comprising a body and a measuring pin slidable in a bore in the body, spaced arms carried by the pin and extending substantially parallel to its axis, a freely tiltable bar between the arms, a support for the bar comprising two pivot members positioned beyond the bar in a direction away from the pin and spaced laterally of the pin axis and carried by the arms, said pivot members extending toward the pin and terminating in a plane substantially normal to the axis of the pin, means on the body providing an additional pivot adapted to contact with the bar, said pivots being relatively arranged to support the bar in such a manner that the bar contacts alternately with the two first mentioned pivots during a predetermined axial movement of the pin and at one time with all the pivots, yielding means connected with the bar to hold it in contact with at least two of the pivots at all times, a pointer fastened to the bar and projecting from the body, and a scale operatively associated with the pointer and having graduations indicative of different space-unit fractions at respective portions thereof on each side of the region of the scale indicated by the pointer when the bar is in contact with all the pivots.

9. In a measuring instrument having a lever element adapted for amplifying motion transmitted to it, and a scale cooperatively associated therewith, three pivot members for the lever element spaced from each other longitudinally of the lever element, said lever element and pivot members being so constructed and arranged that the lever element engages two of the spaced pivot members and disengages one of said two members during a complete movement of the lever element in a single direction with reference to the scale about the third pivot member, whereby the lever element can cooperate successively with said two spaced members for amplification of motion in different ratios of transmitted to indicated movement.

10. In a measuring instrument having a lever element for amplifying motion transmitted to it and indicating the same with reference to a scale, means engaging the lever element for transmitting motion to said element, and two fixed fulcrums for the lever element spaced apart longitudinally thereof and positioned in the same direction beyond the point of engagement of said means with said element, the fixed fulcrums being readily disengageable from the lever element, whereby the fulcrums can cooperate successively and independently with said element in definite respective portions of the swinging movement of the lever element in one direction.

11. In a measuring instrument having a lever element arranged for amplifying motion transmitted to it and indicating the same with reference to a scale, a single fixed pivot for the lever element, and means spaced from the fixed pivot along said element in one direction for moving said element, said means comprising pivot members both engageable with and disengageable from the lever element but at respective points spaced along the lever element, whereby to change automatically the ratio of transmitted to indicated movement in different portions of the throw of the lever element in a single direction about the fixed pivot.

GEORGE D. WEBBER.